United States Patent
McDonald-Maier et al.

(10) Patent No.: US 11,101,989 B2
(45) Date of Patent: Aug. 24, 2021

(54) TRUSTED RING

(71) Applicant: Metrarc Limited, Colchester (GB)

(72) Inventors: Klaus Dieter McDonald-Maier, Harwich (GB); William Gareth James Howells, Whitstable (GB); Ruhma Tahir, Ipswich (GB)

(73) Assignee: Metrarc Limited, Colchester (GB)

( * ) Notice: Subject to any disclaimer, the term of this patent is extended or adjusted under 35 U.S.C. 154(b) by 94 days.

(21) Appl. No.: 16/580,786

(22) Filed: Sep. 24, 2019

(65) Prior Publication Data
US 2020/0099521 A1    Mar. 26, 2020

(30) Foreign Application Priority Data
Sep. 24, 2018 (GB) .................................. 1815520

(51) Int. Cl.
*H04L 9/08* (2006.01)
*H04L 9/14* (2006.01)
(Continued)

(52) U.S. Cl.
CPC .......... *H04L 9/0861* (2013.01); *H04L 9/0825* (2013.01); *H04L 9/0894* (2013.01);
(Continued)

(58) Field of Classification Search
CPC ....... H04L 9/08; H04L 9/0861; H04L 9/0825; H04L 9/0894; H04L 9/14; H04L 9/30;
(Continued)

(56) References Cited

U.S. PATENT DOCUMENTS

| 2006/0095957 A1* | 5/2006 | Lundblade ................ H04L 9/32 726/5 |
| 2010/0119062 A1 | 5/2010 | Hopkins et al. |

(Continued)

FOREIGN PATENT DOCUMENTS

| CN | 102006166 B | * | 1/2013 | ............... H04L 9/32 |
| ES | 2400895 B1 | * | 3/2014 | ............... H04L 9/32 |
| WO | 2016128989 A1 | | 8/2016 | |

OTHER PUBLICATIONS

An Exploration of Group and Ring Signatures by Sarah Meiklejohn pp. 20; Dated: Feb. 4, 2011.*
(Continued)

*Primary Examiner* — Samson B Lemma
*Assistant Examiner* — Ali H. Cheema
(74) *Attorney, Agent, or Firm* — Cook Alex Ltd.; R. Blake Johnston

(57) ABSTRACT

A method for generating an authentication key for providing a digital signature at a device for authenticating an output from a ring comprising a plurality of peers, the method comprising generating respective security credentials for each peer of a plurality of peers constituting a ring of peers, at least one security credential being generated in dependence on one or more feature of the respective peer device; generating a ring key in respect of the ring in dependence on the respective security credential of each peer constituting the ring; and generating an authentication key in dependence on the ring key, a security credential of a first peer and respective security credentials of at least one of the other peers.

18 Claims, 7 Drawing Sheets

(51) Int. Cl.
*H04L 9/30* (2006.01)
*H04L 9/32* (2006.01)

(52) U.S. Cl.
CPC .............. *H04L 9/14* (2013.01); *H04L 9/3242* (2013.01); *H04L 9/302* (2013.01); *H04L 9/3026* (2013.01); *H04L 9/3066* (2013.01); *H04L 9/3239* (2013.01); *H04L 9/3252* (2013.01); *H04L 9/3255* (2013.01); *H04L 2209/38* (2013.01)

(58) Field of Classification Search
CPC ... H04L 9/302; H04L 9/3026; H04L 2209/38; H04L 9/3066; H04L 9/3239; H04L 9/3249; H04L 9/3252; H04L 9/3255; H04L 9/32; H04L 9/3242; H04L 2209/04
USPC .............................. 713/171, 176, 180; 726/5
See application file for complete search history.

(56) References Cited

U.S. PATENT DOCUMENTS

| | | | | |
|---|---|---|---|---|
| 2012/0166808 | A1* | 6/2012 | Hong | H04L 9/3255 713/180 |
| 2012/0278628 | A1* | 11/2012 | Chen | H04L 9/0863 713/176 |
| 2013/0086662 | A1* | 4/2013 | Roth | G06F 21/31 726/7 |
| 2013/0086663 | A1* | 4/2013 | Roth | H04L 9/3242 726/7 |
| 2015/0286747 | A1* | 10/2015 | Anastasakos | G06F 16/9017 707/776 |
| 2015/0372875 | A1* | 12/2015 | Turon | H04L 69/16 370/254 |
| 2016/0044001 | A1* | 2/2016 | Pogorelik | H04L 9/085 713/168 |
| 2016/0065549 | A1* | 3/2016 | Roth | H04L 63/06 713/170 |
| 2016/0349999 | A1* | 12/2016 | Adler | H04L 9/3268 |
| 2018/0206117 | A1* | 7/2018 | Stahl | H04L 9/3263 |
| 2018/0270051 | A1* | 9/2018 | Roth | G06F 21/602 |
| 2020/0082126 | A1* | 3/2020 | Brown | H04L 9/006 |

OTHER PUBLICATIONS

A new way to generate a ring: Universal ring signature by Raylin Tso (Computer Science Department, National Chengchi University, Wenshan, Taipei 11605, Taiwan) pp. 10; (Year: 2013).*

Self-stabilizing Structured Ring Topology P2P Systems by Ayman Shakerand Douglas S. Reeves (Departments of Electrical and Computer Engineering and Computer Science) pp. 8; IEEE (Year: 2005).*

Security and Privacy Issues in Wireless Mesh Networks: A Survey by Jaydip Sen (Innovation Labs, Tata Consultancy Services Ltd. Kolkata, India) pp. 62; (Year: 2013).*

A survey of ring signature by Lingling Wang, Guoyin Zhang, Chunguang Ma pp. 10; (Year: 2008).*

Hopkins, Andrew B. T.; et al. "Ensuring data integrity via ICmetrics based security infrastructure." Second NASA/ESA Conference on Adaptive Hardware and Systems (AHS 2007) (2007): 75-81.

Kovalchuk, Yevgeniya; et al., "Overview of ICmetrics Technology—Security Infrastructure for Autonomous and Intelligent Healthcare System." (2011).

Tahir, Ruhma; et al., "A Scheme for the Generation of Strong ICMetrics Based Session Key Pairs for Secure Embedded System Applications." 2013 27th International Conference on Advanced Information Networking and Applications Workshops (2013): 689-696.

Search Report from Intellectual Property Office of Great Britain / United Kingdom for Patent Application No. GB1815520.0, dated Mar. 11, 2020 (5 pages).

O. Goldreich et al. (Eds.): "Theoretical Computer Science,", LNCS 3895, Springer pp. 164-186, Rivest, Ronald L. et al., "How to Leak a Secret: Theory and Applications of Ring Signatures."

Tahir et al, "A Scheme for the Generation of Strong Cryptographic Key Pairs Based on ICMetrics," 2012 International Conference for Internet Technology and Secured Transactions, London, 2012, pp. 168-174.

Tahir et al. "On Secure Group Admission Control Using ICMetrics." 2014 Fifth International Conference on Emerging Security Technologies (2014): 82-87.

* cited by examiner

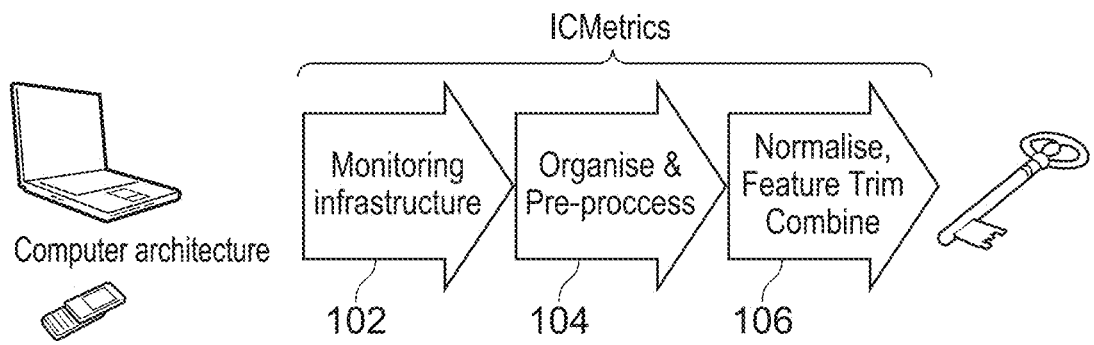
FIG. 1
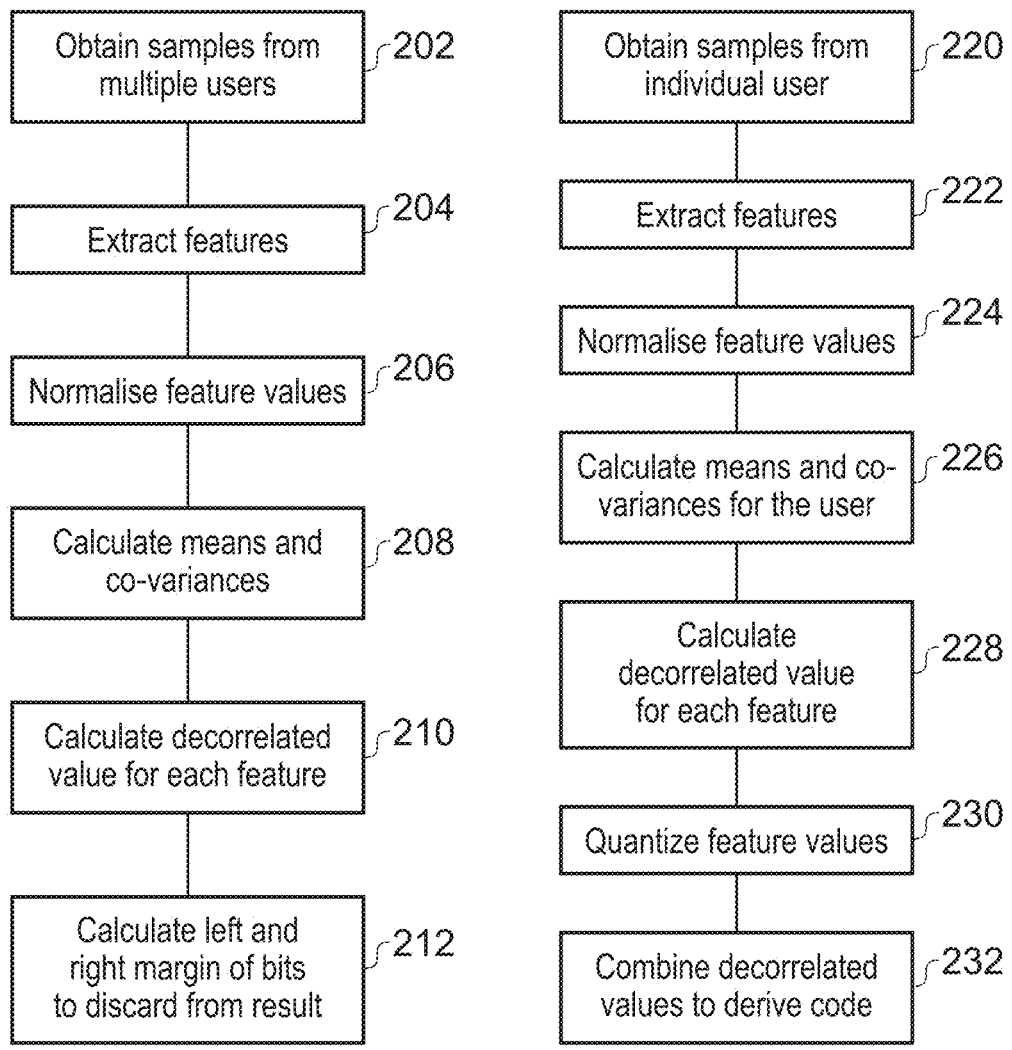
FIG. 2A
FIG. 2B

TRUSTED RING

The present invention relates to trusted rings, and to establishing a trusted ring for providing security among a group of peers constituting the ring.

BACKGROUND

The Internet of Things (IoT) refers to billions of entities across the globe connected to the internet. However, the security of the IoT is a big concern, since it exposes all the entities that are part of the IoT ecosystem to a wide range of security threats such as privacy, integrity and access control. Proper security mechanisms are essential for the widespread deployment of the IoT across all platforms.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an aspect of the present invention there is provided a method for generating an authentication key for providing a digital signature at a device for authenticating an output from a ring comprising a plurality of peers, the method comprising:

generating respective security credentials for each peer of a plurality of peers constituting a ring of peers, at least one security credential being generated in dependence on one or more feature of the respective peer device;

generating a ring key in respect of the ring in dependence on the respective security credential of each peer constituting the ring; and generating an authentication key in dependence on the ring key, a security credential of a first peer and respective security credentials of at least one of the other peers.

The respective security credential for each peer of a plurality of peers may comprise at least a portion of a public/private key pair, and the authentication key may be generated in dependence on a private key of the first peer and respective public keys of at least one of the other peers. Generating the authentication key may comprise determining a set of one-way functions in dependence on the security credential of the first peer, generating a verification function in dependence on the set of one-way functions, and combining the verification function with the ring key using a combination function to generate the authentication key.

The set of one-way functions may be determined in dependence on a set of tags, the set of tags comprising a tag for each peer other than the first peer, the method comprising storing the set of tags. The set of one-way functions may be determined in dependence on at least one integer value, and the method may comprise storing the at least one integer value. The combination function may comprise an XOR function.

Generating the at least one security credential may comprise measuring a value of one or more feature of the respective peer device to generate a respective one or more feature value, normalising the one or more feature value using a respective normalisation map for each feature to generate one or more normalised value, and generating the security credential in dependence on the one or more normalised value. Generating the at least one security credential may comprise using a key generation algorithm which operates on the one or more normalised value. Generating the at least one security credential may comprise using a key generation algorithm which combines a plurality of normalised values. Using the key generation algorithm may comprise dividing a key to form an asymmetric public and private key pair.

The method may comprise, after generating the authentication key, discarding the ring key and/or the security credential of the first peer. The method may comprise one or more of: where the security credentials of the peers comprise public keys, storing the public keys of the peers, storing the set of tags, and storing the at least one integer value.

Generating the ring key may comprise: determining a tolerance value indicating the number of peers required to process the ring key, determining coefficients of a polynomial of an order that is one less than the tolerance value, the ring key being a function of the polynomial, generating the respective security credentials comprises, for a number of security credentials equal to or greater than the tolerance value, determining each of those security credentials in dependence on one or more feature of a respective peer device of the plurality of peers, and generating the ring key may further comprise: using each security credential as a first parameter of the polynomial to generate a set of corresponding second parameter values, and storing the set of second parameter values and a value indicating the order of the polynomial.

The tolerance value may be less than the number of peers in the plurality of peers constituting the ring of peers. Each of the number of security credentials may be used as an x-value of the polynomial and the second parameter values may comprise y-values. The number of security credentials and the polynomial may be discarded in dependence on storing the set of second parameter values and the value indicating the order of the polynomial.

According to another aspect of the present invention there is provided a method for processing an authentication key at a device comprising:

receiving an authentication key generated as defined herein;

accessing a stored set of public keys for peers in a ring of peers and an identification of a first peer, a security credential of which first peer is used in the generation of the received authentication key;

regenerating the security credential of the first peer in dependence on one or more feature of the first peer device;

generating a further authentication key in dependence on the regenerated security credential of the first peer and the set of public keys; and verifying the received authentication key against the further authentication key.

Respective security credentials for the peers may comprise respective public keys which are stored as the set of public keys. The security credential of the first peer may comprise a private key and the received authentication key may be generated in dependence on that private key. Regenerating the security credential of the first peer may comprise regenerating the private key of the first peer and the further authentication key may be generated in dependence on the regenerated private key. The received authentication key may be associated with a message, and the method may comprise authenticating the message in dependence on verifying that the received authentication key verifies against the further authentication key.

The method may comprise determining that the received authentication key verifies against the further authentication key where the received authentication key matches the further authentication key. The method may comprise generating a ring key in respect of the ring and generating the further authentication key in dependence on the ring key.

Generating the ring key may comprise: (a) determining a plurality of security credentials in dependence on one or more feature of respective peer devices of the ring, (b) reading a stored set of parameter values and a stored value indicating an order of a polynomial, (c) determining coordinates from respective ones of the security credentials and respective ones of the parameter values, (d) using at least a subset of the determined coordinates to determine coefficients of a polynomial with an order indicated by the stored value, (e) determining a predetermined function of the polynomial, (f) storing the predetermined function as a possible ring key, (g) repeating steps (d) to (f) for all the subsets of coordinates to determine a set of possible ring keys, (h) verifying whether the set of possible ring keys comprises the ring key.

The method may comprise generating the further authentication key in dependence on a stored set of tags and/or at least one stored integer value.

According to another aspect of the present invention there is provided computer program code for performing a method as defined herein.

According to another aspect of the present invention there is provided a non-transitory computer-readable storage medium having stored thereon computer-readable instructions that, when executed at a computer system, cause the computer system to perform the method as defined herein.

According to another aspect of the present invention there is provided a system for generating an authentication key at a device for authenticating an output from a ring comprising a plurality of peers, the system comprising a processor configured to:

generate respective security credentials for each peer of a plurality of peers constituting a ring of peers, at least one security credential being generated in dependence on one or more feature of the respective peer device;

generate a ring key in respect of the ring; and generate an authentication key in dependence on the ring key, a security credential of a first peer and respective security credentials of at least one of the other peers.

According to another aspect of the present invention there is provided a system for processing an authentication key at a device, the system comprising a processor configured to:

receive an authentication key generated as defined herein;

access a stored set of public keys for peers in a ring of peers and an identification of a first peer, a security credential of which first peer being used in the generation of the received authentication key;

regenerate the security credential of the first peer in dependence on one or more feature of the first peer device;

generate a further authentication key in dependence on the regenerated security credential of the first peer and the set of public keys; and verify the received authentication key against the further authentication key.

According to another aspect of the present invention there is provided a method for committing a transaction on a permissioned blockchain comprising:

receiving, in respect of a plurality of peers forming at least part of a permissioned blockchain, a transaction signed with an authentication key, the authentication key being generated in dependence on one or more feature of at least one peer of the plurality of peers, regenerating the authentication key in dependence on the one or more feature of the at least one peer, and committing the transaction on the permissioned blockchain in dependence on verifying the received authentication key against the regenerated authentication key.

The authentication key may be generated as defined herein.

Any one or more feature of any aspect above may be combined with any one or more feature of any other aspect above. Any apparatus feature may be rewritten as a method feature, with the necessary changes being made in the wording. These have not been written out in full here merely for the sake of brevity.

BRIEF DESCRIPTION OF THE DRAWINGS

The present invention will now be described by way of example with reference to the accompanying drawings. In the drawings:

FIG. 1 illustrates stages in a key generation process;

FIG. 2A illustrates a series of steps in a calibration phase of a key generation process;

FIG. 2B illustrates a series of steps in an operation phase of a key generation process;

DETAILED DESCRIPTION

Figure 3:
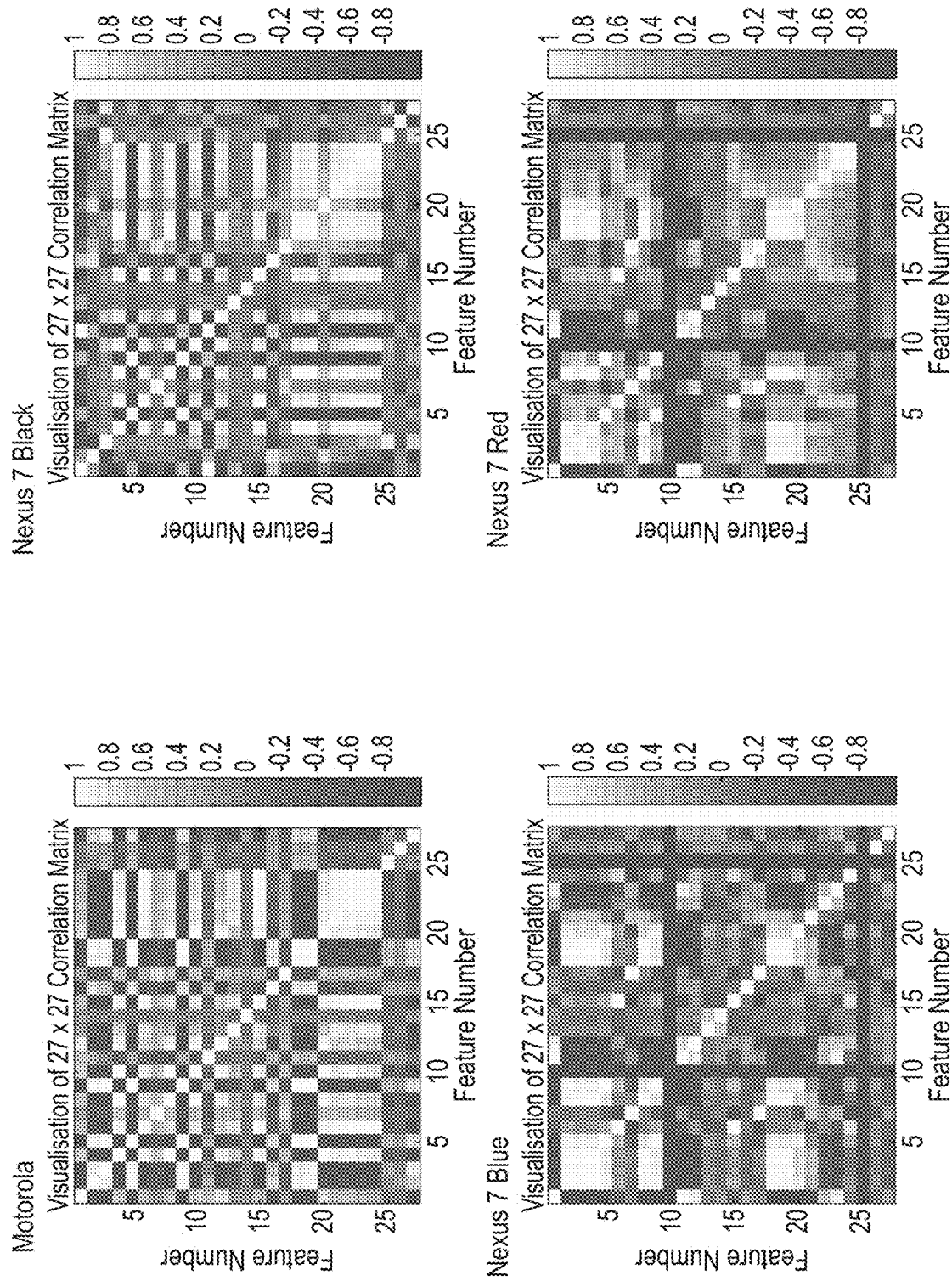
FIG. 3 illustrates correlation patterns for different mobile devices.
Figure 3:
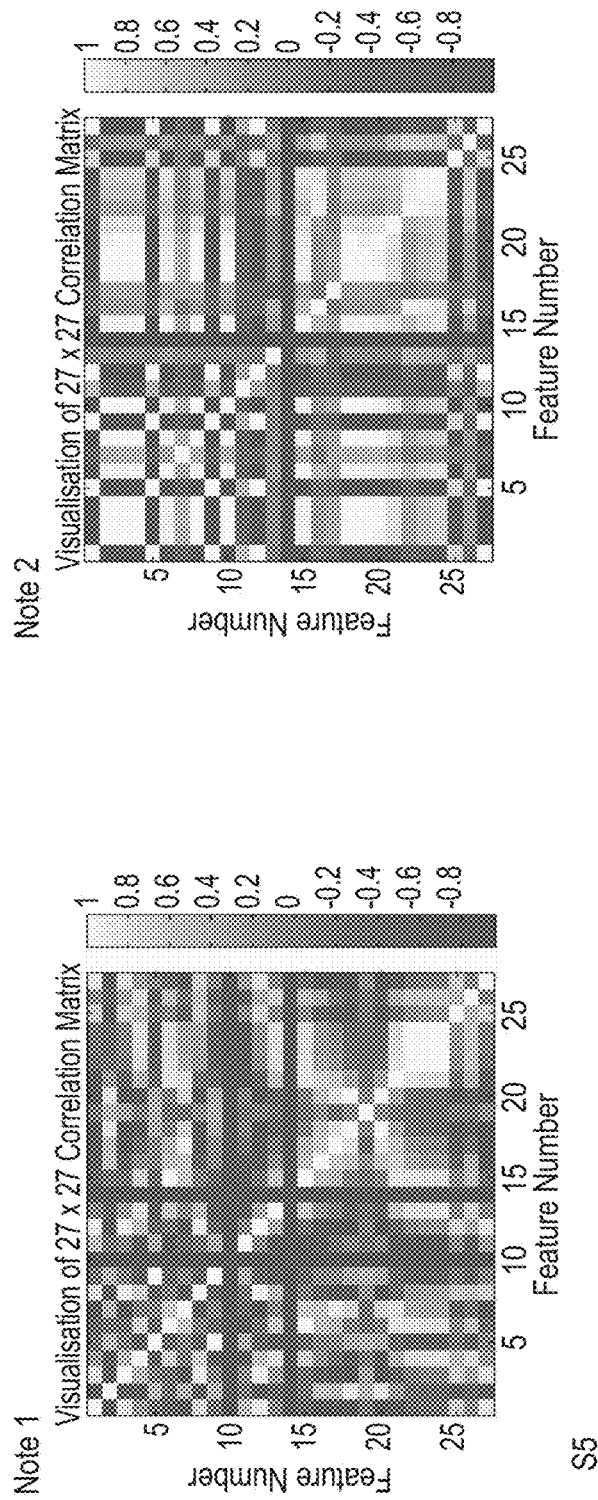

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

The present techniques can facilitate secure authentication between peers in a group of peers. In some embodiments all of the peers in the group of peers are required to be authenticated or verified before the group of peers can be authenticated. In other examples fewer than the total number of peers in the group of peers are required to be authenticated before the group of peers can be authenticated.

In general, for a group of n peers comprising Peer 1, Peer 2, ..., Peer n, authentication can be achieved for the group where at least N peers are authenticated, where $N \leq n$.

There is thus provided a way of verifying an output from the group of peers. The output from the group of peers can be verified where at least N of the n peers are authenticated. The present techniques are also useful where a decision is to be made. Where at least N peers of the group of n peers are authenticated and/or agree to the decision, the decision can be deemed to be authenticated and/or taken. Thus, a decision or other output of the group of peers can be taken or authenticated where one or more of the peers is not authenticated, not present, and/or dissents. This approach can therefore assist in the smooth operation of a group of peers, even in the event of one or more peer being absent or compromised. This can avoid delays in waiting for a peer to become present in the group and/or attending to a compromised peer (if possible). In this way, the present techniques can facilitate a more efficient system.

Thus, the present techniques provide a way in which security can be provided between a group of peers or other entities.

The group of peers can form a ring of peers, which can simply be called a ring. Authentication of the threshold number of peers, N, in the group of n peers forming the ring can establish a trusted ring. The trusted ring may be composed of all entities wishing to form part of a secure network.

For example, security can be provided among a group of peers in the Internet of Things (IoT). Each peer or entity in the ring can be an IoT module or device. The trusted ring may be composed of all entities wishing to form part of a secure IoT network.

The techniques described herein can be used to establish a trusted ring in a myriad of applications such as a network, for example an IoT network. The techniques are independent of any particular application, and so have wide applicability where security is of interest or concern.

An example application, discussed further below, is the use of the techniques described herein to commit transactions to a permissioned blockchain. The establishment and use of a trusted ring can help maintain the integrity of data stored in a permissioned blockchain. In this example, the trusted ring may be composed of all member peers wishing to form part of the permissioned blockchain network.

The present techniques can also benefit from the use of Integrated Circuit Metric (ICMetric) techniques discussed in our co-pending application PCT/GB2018/050758 and introduced in brief herein. The use of ICMetric techniques can provide additional security by enhancing the security of encryption keys, such as public and private key pairs, associated with one or more peer.

ICMetrics refers to a modern technology that can be used to extract measurable and unique attributes from the hardware and/or software environment of a system. The technology exploits the fact that each device has its own internal environment. Therefore, factors that make each entity different can be used to generate an on-demand unique identification for every device. ICMetrics may be considered as the computer equivalent of biometrics. However, unlike traditional biometrics, unique templates are not needed to create the final encryption key, so the approach is significantly more secure than conventional encryption techniques, including those incorporating biometrics.

As mentioned above, a group of peers can comprise n peers: Peer 1, Peer 2, . . . , Peer n. A security credential, for example a public/private key pair, which can be used in subsequent encryption, decryption and validation techniques, is generated for each peer. The generation of the security credential such as the public/private key pair for each peer can be performed in any suitable manner. For example, one or a combination of more than one conventional technique can be used to obtain the public/private key pair for a given peer. The generation of the security credential for a peer need not be the same generation technique as for another peer.

In some examples, the generation of the security credential for at least one peer, and suitably for all n peers in the group of n peers, can be performed in dependence on an ICMetric for the respective peer. An ICMetric is generated in dependence on a property or characteristic of the peer, for example a device, that generates it. For example, the ICMetric can be generated in dependence on a fixed and/or transient hardware and/or software property such as device serial number, device memory, free memory, applications, applications running, network connectivity and/or status, Wi-Fi SSID, IP address, contacts stored at or otherwise accessible to the device, images stored at or otherwise accessible to the device, and/or any one or more combination of these and other properties. Correlations of one or more device property may also be used, optionally in combination with other properties, combinations of properties and/or correlations between other properties. Examples of possible features for use in ICMetric techniques are explained in detail in PCT/GB2018/050758.

Thus, the ICMetric is dependent on the characteristics of the device itself, i.e. it includes a what-you-have element in the generating process.

Briefly, a process for generating an ICMetric is as follows. The technique employed by ICMetrics uses a normalisation and combination strategy to merge a series of metrics, which suitably represent one or more of the properties, features and behavioural characteristics of a computer, device or service, into a single all-encompassing value, which is the system's ICMetric. Suitably, the ICMetric architecture has three stages as shown in FIG. 1.

In the first stage, the component metrics are obtained using a monitoring infrastructure 102 that suitably employs a novel architecture in order to efficiently characterise the computer's behaviour while it operates normally. Following collection of measurement data, optimised pre-processing occurs in stage two 104, which extracts raw property and feature values and provides a consistent data format ready for final processing. In the final stage 106, custom normalisation and trimming techniques are employed to maximize the ICMetric's permutations and therefore security. The combination strategy employs advanced pattern recognition techniques that are generic to instances of a computer design, rather than individual templates; therefore, it is infeasible to recreate the ICMetric for a specific computer or electronic device, without first capturing all of its many sample values that are only in existence when encryption is needed.

The primary purpose of the technology is thus to encrypt components of devices, systems or services using properties, or features, derived from their own construction and behaviour to form a digital signature capable of assuring both their authenticity and freedom from malware whilst simultaneously allowing the flexibility for them to operate within their designed specification and to execute on an arbitrary (i.e. any desired) platform. The ability to securely access services located online, for example in or via an IoT network, from a mobile device offers significant advantages for ease of provision and access to both existing and bespoke network-based services. However, such technology also presents significant challenges in assuring that the service accessed is authentic and free from any form of malware. The need to protect the integrity of each service has long been recognised, but the increasingly widespread adoption of network-based services raises new challenges, particularly where these services are communicating autonomously. Advantageously the measured features (or characteristics) need not remain absolutely constant but are free to vary, for example within parameters such as deduced parameters. This allows the software to operate in several states and on a variety of differing platforms whilst still ensuring that any illegal clone or malware infecting the software is detected via unacceptable changes in the operating parameters. ICMetrics thus represents an approach for creating unique identifiers for software systems enabling the generation of unique digital signatures and potential secure encrypted communication between services.

A more detailed description of the operation of the system to generate an ICMetric is as follows. In one implementation, the proposed ICMetric-based system is a two-phase system. Suitably the system comprises a calibration phase and an operation phase. Each phase may operate as follows.

Calibration phase (this phase is suitably applied once only per application domain).

1. For each service: measure the desired feature value or values, for example one or more operating characteristic of the associated software and/or hardware.

2. Generate feature distributions for each feature illustrating the frequency of each occurrence of each discrete value, for example for each sample circuit. This allows the same digital signature to be generated from the normal variations of operation of the software concerned. It can also ensure any abnormal variation fails to generate the correct digital signature.

3. Normalise the feature distributions generating normalisation maps for each feature. These normalisation maps suitably relate the range of measured values for a given feature (such as a software system) to a fixed range of values chosen for that particular feature. The absolute values of features can thus be discarded, and abstract virtual values may suitably be chosen in their place.

Operation phase (this phase is suitably applied each time an encryption key is desired for a given circuit).

1. Measure features for the given software and/or hardware system for which a digital signature (or an encryption key) is desired.

2. Apply the normalisation maps to generate values suitable for key generation.

3. Apply the key generation algorithm which combines the normalised feature values into a single key (termed the basis key).

4. Divide the basis key to form an asymmetric key pair (several techniques are possible to do this, as will be appreciated by the skilled person) which may then be employed to provide a digital signature for the service in question. This is suitably done by encrypting a digest of component data of the service. Alternatively, or additionally, the asymmetric key pair may be employed for secure communications in conjunction with the asymmetric key pair associated with another service.

The ICMetric system may be used in conjunction with a range of encryption algorithms. It is suitably independent of any particular encryption algorithm.

The operation of the system may be as illustrated in FIG. 2. FIG. 2A illustrates the calibration phase. In this phase, samples are obtained from multiple users 202. Features are extracted from the samples 204. Feature values are then normalised 206. One or more mean and co-variance is calculated 208. Decorrelated values are then calculated for each feature 210. Left and right margins of bits to discard from the result are calculated 212. (In some examples, only one or other of the left and right margins of bits to discard need be calculated.) This latter step can aid in obfuscating the result, i.e. it will restrict the ability of an observer to recreate the value from which the result was obtained, or even to guess what feature the value relates to. FIG. 2B illustrates the operation phase. In this phase, samples are obtained from an individual user 220. Features are extracted from the sample 222 and normalised 224. Means and co-variances are calculated 226. A decorrelated value is calculated for each feature 228. Feature values are quantized 230. Decorrelated values are combined to derive a code 232.

ICMetric Key Generation

Generating an ICMetric key is a lightweight process that firstly involves the gathering of feature values from the device. The features can then be combined into categories, which go through the normalisation algorithm. This suitably obfuscates and/or normalises the categories into words. The normalised values may comprise words of a predetermined size/length. The generated words are then used to produce an un-hashed ICMetric key via the secret sharing algorithm discussed in more detail below. The ICMetric key can then, for example, be employed in any of the protocols outlined below. The algorithm takes into account the maximum error tolerance and, if the feature values that were measured meet the minimum tolerance, then the correct key will be regenerated. An illustrative description of how the key is generated for the developed demonstrator provides a detailed example of the key generation process, using a small number of straightforward features to provide a clear illustration of the process. A number of high-level, user-dependent features are extracted and analysed for developing the ICMetrics-based system. The following steps are carried out to generate the key in a smartphone-based embodiment.

Step 1: Define Feature Categories

By concatenating the selected features, four different feature categories were defined. The purpose was to combine those features that fall in a specific class/category.

TABLE 1

Feature Category 1

| | | Feature Name | | |
|---|---|---|---|---|
| | Free Bits | Mobile Country Code | Mobile Network Code | ISO Country Code |
| Range | N/A | 0-999 | 0-999 | AA-ZZ |
| Required Bits | 28 | 10 | 10 | 16 |

Category 1 (as shown in table 1) is related to a device's network configuration with the mobile country code and the mobile network code being used in combination to uniquely identify the device's carrier. The mobile country code and the ISO country code are fully dependent on one another whereas the mobile country code and the mobile network code are independent.

TABLE 2

Feature Category 2

| | Feature Name | | | | | | |
|---|---|---|---|---|---|---|---|
| | Free Bits | Allows VOIP | Bluetooth Active | Location Services | Wi-Fi Connected | Internet Connected | Wi-Fi SSID |
| Range | N/A | 0-1 | 0-1 | 0-1 | 0-1 | 0-1 | First 7 Characters |

TABLE 2-continued

| | Feature Category 2 | | | | | | |
|---|---|---|---|---|---|---|---|
| | Feature Name | | | | | | |
| | Free Bits | Allows VOIP | Bluetooth Active | Location Services | Wi-Fi Connected | Internet Connected | Wi-Fi SSID |
| Required Bits | 3 | 1 | 1 | 1 | 1 | 1 | 56 |

Category 2 (as shown in table 2) is related to the connectivity of a device and most of the features are a binomial value that dictates the states of the features. The practical entropy is mostly dependent on the knowledge of the Wi-Fi SSID that the device is connected to and although any possible SSID is available, common names are more likely to occur.

TABLE 3

| | Feature Category 3 | | | |
|---|---|---|---|---|
| | Feature Name | | | |
| | Free Bits | Number of Contacts | Number of Contacts First Name starting with 'S' | Number of Contacts First Name starting with 'M' |
| Range | N/A | 0-4095 | 0-1023 | 0-1023 |
| Required Bits | 32 | 12 | 10 | 10 |

Category 3 (shown in table 3) is based on the contacts on the devices and randomly associated filters on the contacts. In the simple example above the contacts are filtered by the first letters of the first and second name of the contact.

TABLE 4

| | Feature Category 4 | | | |
|---|---|---|---|---|
| | Feature Name | | | |
| | Image File Size (Bytes) | Image Orientation | Image Height | Image Width |
| Range | 0-4294967295 | 0-15 | 0-16383 | 0-16383 |
| Required Bits | 32 | 4 | 14 | 14 |

Category 4 (shown in table 4) is based on the media that is saved on the device; which in this case is an arbitrary image. This category can be re-used with multiple images, in this example it is used twice as Category 4A and 4B, each based on a different image.

Step 2: Fixed Masking

To perform data confusion and diffusion, we performed XOR operations between each 64-bit feature category word and a pre-defined mask. Assume that:

V=Feature category 1 word consisting of 8 bytes
$v_1$ (LSB), $v_2$, $v_3$, $v_4$, $v_5$, $v_6$, $v_7$, $v_8$ (MSB)
W=Feature category 2 word consisting of 8 bytes
$w_1$ (LSB), $w_2$, $w_3$, $w_4$, $w_5$, $w_6$, $w_7$, $w_8$ (MSB)
X=Feature category 3 word consisting of 8 bytes
$x_1$ (LSB), $x_2$, $x_3$, $x_4$, $x_5$, $x_6$, $x_7$, $x_8$ (MSB)
Y=Feature category 4A word consisting of 8 bytes
$y_1$ (LSB), $y_2$, $y_3$, $y_4$, $y_5$, $y_6$, $y_7$, $y_8$ (MSB)
Z=Feature category 4B word consisting of 8 bytes
$z_1$ (LSB), $z_2$, $z_3$, $z_4$, $z_5$, $z_6$, $z_7$, $z_8$ (MSB)

where (MSB) stands for most significant byte and (LSB) is the least significant byte.

The feature matrix can then be defined as:

$$\text{Feature Matrix} = \begin{bmatrix} V \\ W \\ X \\ Y \\ Z \end{bmatrix} = \begin{bmatrix} v_8 & v_7 & v_6 & v_5 & v_4 & v_3 & v_2 & v_1 \\ w_8 & w_7 & w_6 & w_5 & w_4 & w_3 & w_2 & w_1 \\ x_8 & x_7 & x_6 & x_5 & x_4 & x_3 & x_2 & x_1 \\ y_8 & y_7 & y_6 & y_5 & y_4 & y_3 & y_2 & y_1 \\ z_8 & z_7 & z_6 & z_5 & z_4 & z_3 & z_2 & z_1 \end{bmatrix}$$

The following arbitrarily chosen pre-defined mask (each row is 64-bit) can be utilised:

$$\text{Fixed Mask} = \begin{bmatrix} A \\ B \\ C \\ D \\ E \end{bmatrix} = \begin{bmatrix} a_8 & a_7 & a_6 & a_5 & a_4 & a_3 & a_2 & a_1 \\ b_8 & b_7 & b_6 & b_5 & b_4 & b_3 & b_2 & b_1 \\ c_8 & c_7 & c_6 & c_5 & c_4 & c_3 & c_2 & c_1 \\ d_8 & d_7 & d_6 & d_5 & d_4 & d_3 & d_2 & d_1 \\ e_8 & e_7 & e_6 & e_5 & e_4 & e_3 & e_2 & e_1 \end{bmatrix}$$

where
A=Mask for feature category 1 consisting of 8 bytes
$a_1$ (LSB), $a_2$, $a_3$, $a_4$, $a_5$, $a_6$, $a_7$, $a_8$ (MSB)
B=Mask for feature category 2 consisting of 8 bytes
$b_1$ (LSB), $b_2$, $b_3$, $b_4$, $b_5$, $b_6$, $b_7$, $b_8$ (MSB)
C=Mask for feature category 3 consisting of 8 bytes
$c_1$ (LSB), $c_2$, $c_3$, $c_4$, $c_5$, $c_6$, $c_7$, $c_8$ (MSB)
D=Mask for feature category 4A consisting of 8 bytes
$d_1$ (LSB), $d_2$, $d_3$, $d_4$, $d_5$, $d_6$, $d_7$, $d_8$ (MSB)
E=Mask for feature category 4B consisting of 8 bytes
$e_1$ (LSB), $e_2$, $e_3$, $e_4$, $e_5$, $e_6$, $e_7$, $e_8$ (MSB)

Arbitrarily chosen values were then assigned to the elements of the Fixed Mask matrix for achieving data obfuscation:

$$\text{Fixed Mask} = \begin{bmatrix} A \\ B \\ C \\ D \\ E \end{bmatrix} =$$

$$\begin{bmatrix} 0x0F & 0x0E & 0x0D & 0x0C & 0x0B & 0x0A & 0x09 & 0x08 \\ 0x80 & 0x90 & 0xA0 & 0xB0 & 0xC0 & 0xD0 & 0xE0 & 0xF0 \\ 0x99 & 0x88 & 0x77 & 0x66 & 0x55 & 0x44 & 0x33 & 0x22 \\ 0xFF & 0xFA & 0xFB & 0xFC & 0x01 & 0x02 & 0x03 & 0x04 \\ 0x40 & 0x80 & 0xA0 & 0xF0 & 0x59 & 0x95 & 0x29 & 0x92 \end{bmatrix}$$

Finally, bit-wise XOR operations were performed between the Feature Matrix and Fixed Mask matrices to obtain an XORED matrix:

$$XORED =$$

$$\text{Feature Matrix Mask} \oplus \text{Mask} = \begin{bmatrix} v'_8 & v'_7 & v'_6 & v'_5 & v'_4 & v'_3 & v'_2 & v'_1 \\ w'_8 & w'_7 & w'_6 & w'_5 & w'_4 & w'_3 & w'_2 & w'_1 \\ x'_8 & x'_7 & x'_6 & x'_5 & x'_4 & x'_3 & x'_2 & x'_1 \\ y'_8 & y'_7 & y'_6 & y'_5 & y'_4 & y'_3 & y'_2 & y'_1 \\ z'_8 & z'_7 & z'_6 & z'_5 & z'_4 & z'_3 & z'_2 & z'_1 \end{bmatrix},$$

where matrix elements with a dash on top denote the modified bytes after the XOR operation.

Step 3: Confusion/Byte Jumbling

In this step, bytes in each feature category word were jumbled, again to achieve data obfuscation. Alternative techniques for achieving data obfuscation are possible, as will be appreciated by the skilled person. The first row and the fifth row of the XORED matrix were given a circular 1-byte left shift individually; the second row was given a circular left shift of 3 bytes. Similarly, circular left shift operations of 2 bytes and 4 bytes were performed on the third and the fourth rows respectively. This may be expressed mathematically as:

$$JUMBLED = \begin{bmatrix} v'_7 & v'_6 & v'_5 & v'_4 & v'_3 & v'_2 & v'_1 & v'_8 \\ w'_5 & w'_4 & w'_3 & w'_2 & w'_1 & w'_8 & w'_7 & w'_6 \\ x'_6 & x'_5 & x'_4 & x'_3 & x'_2 & x'_1 & x'_8 & x'_7 \\ y'_4 & y'_3 & y'_2 & y'_1 & y'_8 & y'_7 & y'_6 & y'_5 \\ z'_7 & z'_6 & z'_5 & z'_4 & z'_3 & z'_2 & z'_1 & z'_8 \end{bmatrix}$$

Step 4: Dynamic Masking Through XOR Operations

As opposed to Step 2, where a pre-defined and fixed mask were utilized, dynamic masking of the JUMBLED matrix was performed in this step. This was achieved by carrying out bitwise XOR operations on specific elements (bytes) of the JUMBLED matrix while using some particular elements (bytes) as mask. Mathematically, it may be written as:

$$DM1 = \begin{bmatrix} v'_7 \oplus v'_6 & v'_6 & v'_5 \oplus v'_4 & v'_4 & v'_3 \oplus v'_2 & v'_2 & v'_1 \oplus v'_8 & v'_8 \\ w'_5 \oplus w'_3 & w'_4 \oplus w'_2 & w'_3 & w'_2 & w'_1 \oplus w'_7 & w'_8 \oplus w'_6 & w'_7 & w'_6 \\ x'_6 \oplus x'_3 & x'_5 \oplus x'_2 & x'_4 \oplus x'_1 & x'_3 & x'_2 & x'_1 & x'_8 \oplus x'_7 & x'_7 \\ y'_4 \oplus y'_8 & y'_3 \oplus y'_7 & y'_2 \oplus y'_6 & y'_1 \oplus y'_5 & y'_8 & y'_7 & y'_6 & y'_5 \\ z'_7 \oplus z'_8 & z'_6 \oplus z'_1 & z'_5 \oplus z'_2 & z'_4 \oplus z'_3 & z'_3 & z'_2 & z'_1 & z'_8 \end{bmatrix}$$

This may be re-written as:

$$DM1 = \begin{bmatrix} m_{11} & m_{12} & m_{13} & m_{14} & m_{15} & m_{16} & m_{17} & m_{18} \\ m_{21} & m_{22} & m_{23} & m_{24} & m_{25} & m_{26} & m_{27} & m_{28} \\ m_{31} & m_{32} & m_{33} & m_{34} & m_{35} & m_{36} & m_{37} & m_{38} \\ m_{41} & m_{42} & m_{43} & m_{44} & m_{45} & m_{46} & m_{47} & m_{48} \\ m_{51} & m_{52} & m_{53} & m_{54} & m_{55} & m_{56} & m_{57} & m_{58} \end{bmatrix}$$

Step 5: Dynamic Masking through XNOR Operations

Similar to Step 5, we again performed dynamic masking of the DM1 matrix to achieve more data obfuscation. This was achieved by carrying out bitwise XNOR operations on specific elements (bytes) of the DM1 matrix while using some particular elements (bytes) as mask. This may be written mathematically as:

$$DM2 = \begin{bmatrix} m_{11} & \overline{m_{12} \oplus m_{11}} & m_{13} & \overline{m_{14} \oplus m_{13}} & m_{15} & \overline{m_{16} \oplus m_{15}} & m_{17} & \overline{m_{18} \oplus m_{17}} \\ m_{21} & m_{22} & \overline{m_{23} \oplus m_{21}} & \overline{m_{24} \oplus m_{22}} & m_{25} & m_{26} & \overline{m_{27} \oplus m_{25}} & \overline{m_{28} \oplus m_{26}} \\ m_{31} & m_{32} & m_{33} & \overline{m_{34} \oplus m_{31}} & \overline{m_{35} \oplus m_{32}} & \overline{m_{36} \oplus m_{33}} & m_{37} & \overline{m_{38} \oplus m_{37}} \\ m_{41} & m_{42} & m_{43} & m_{44} & \overline{m_{45} \oplus m_{41}} & \overline{m_{46} \oplus m_{42}} & \overline{m_{47} \oplus m_{43}} & \overline{m_{48} \oplus m_{44}} \\ m_{51} & m_{52} & m_{53} & m_{54} & \overline{m_{55} \oplus m_{54}} & \overline{m_{56} \oplus m_{53}} & \overline{m_{57} \oplus m_{52}} & \overline{m_{58} \oplus m_{51}} \end{bmatrix}$$

Example of an ICMetrics-Based System

To demonstrate the utility of the present system, a rather simplified practical example will now be discussed. The system is simplified in this example for conciseness only; a practical system would be implemented analogously but with an increased range of features to ensure sufficient entropy. The operating principles would be as stated however. The data for this example was captured from a smartphone. Table 5 lists the values of different features that were available in this example.

TABLE 5

Feature values captured from a test device

| Sr. No. | Features |
|---|---|
| | Features values for Category 1 |
| 1. | Mobile Country Code = 234 (for the UK) |
| 2. | Mobile Network Code = 15 (for Vodafone UK) |
| 3. | ISO Country Code = 26466 (Note that GB = (0110 0111 0110 0010) = 26466) |
| | Features values for Category 2 |
| 1. | VOIP Allowed |
| 2. | Bluetooth Activated |
| 3. | Location Services ON |
| 4. | Not Connected to WI-FI |
| 5. | Connected to the Internet |
| 6. | Name of WI-FI = 0 |

TABLE 5-continued

Feature values captured from a test device

Sr. No. Features

Features values for Category 3

1. Number of Contacts = 3328
2. Number of Contacts with the First Name starting with 'S' = 100
3. Number of Contacts with the Last Name starting with 'M' = 50

Features values for Category 4A

1. File Size for Image5 = 1826963 bytes
2. Orientation for Image5 = 1
3. Height of Image5 = 1936
4. Width of Image5 = 2592

Features values for Category 4B

1. File Size for Image20 = 1410005 bytes
2. Orientation for Image20 = 1
3. Height of Image20 = 1936
4. Width of Image20 = 2592

The algorithm described above was applied to these feature values and five 64-bit mini-ICMetrics (for the key) were generated. The output of each step of our algorithm for these specific feature values is given below. These results authenticate the validity of the present system and demonstrate its utility.

Step1 Output
CATEGORY1 mini-ICMetrics: 0x3A80F6762
CATEGORY2 mini-ICMetrics: 0x1D00000000000000
CATEGORY3 mini-ICMetrics: 0xD0019032
CATEGORY4A mini-ICMetrics: 0x1 BE09311E40A20
CATEGORY4B mini-ICMetrics: 0x1583D511E40A20
Step2 Output
CATEGORY1 mini-ICMetrics: 0xF0E0D0FA3056E6A
CATEGORY2 mini-ICMetrics: 0x9D90A0B0C0D0E0F0
CATEGORY3 mini-ICMetrics: 0x998877668545A310
CATEGORY4A mini-ICMetrics: 0xFFE11B6F10E60924
CATEGORY4B mini-ICMetrics: 0x40952325487123B2
Step3 Output
CATEGORY1 mini-ICMetrics: 0xE0D0FA3056E6A0F
CATEGORY2 mini-ICMetrics: 0xB0C0D0E0F09D90A0
CATEGORY3 mini-ICMetrics: 0x77668545A3109988
CATEGORY4A mini-ICMetrics: 0x10E60924FFE11B6F
CATEGORY4B mini-ICMetrics: 0x952325487123B240
Step4 Output
CATEGORY1 mini-ICMetrics: 0x30DACA36B6E650F
CATEGORY2 mini-ICMetrics: 0x6020D0E0603D90A0
CATEGORY3 mini-ICMetrics: 0x32C59545A3101188
CATEGORY4A mini-ICMetrics: 0xEF07124BFFE11B6F
CATEGORY4B mini-ICMetrics: 0xD59106397123B240
Step5 Output
CATEGORY1 mini-ICMetrics: 0x3F1ACF06BFA6595
CATEGORY2 mini-ICMetrics: 0x60204F3F603D0F62
CATEGORY3 mini-ICMetrics: 0x32C59588997A1166
CATEGORY4A mini-ICMetrics: 0xEF07124BEF19F6DB
CATEGORY4B mini-ICMetrics: 0xD5910639B7DADC6A Using the secret sharing principle introduced above, the mini-ICMetrics generated are used to generate the ICMetric key. The first time the code is generated is the calibration phase. In this phase, the tolerance in the number of mini-ICMetrics needed for subsequent generation of the ICMetric key can be selected. In this example, the tolerance is selected to be three, meaning that at least three correct mini-ICMetrics (out of the five in this example) will be needed. The second step requires a polynomial of degree (or order) one less than the tolerance; thus in this example a polynomial of order 2 is generated. The following quadratic polynomial is securely randomly generated:

$$f(x) = Ax^2 + Bx + C$$

where: A=0xC7E89F70CA98124A
B=0x316C5A6CA8173E13
C=0xAF7A0C8AC9818F34145AC613E13D24A4
Function Output
CATEGORY1: 0xB3516CE6DC080134577CAB3225CD9BC5
CATEGORY2: 0x10D19620C02F1CD1254DDF25E14385B3E
CATEGORY3: 0xE0ED155FD15E5BFA765B49E918BF56B2
CATEGORY4A: 0x1984744F54AF7C2F61 F67471E20854233
CATEGORY4B: 0x17F7AFFA10C5331D02F66B98C5F1165726

The C value in the polynomial is the Y-axis intercept and is used in one example as the un-hashed ICMetric key. More generally the secure key is suitably a function of the polynomial, such as a value of the polynomial at a predetermined location, e.g. a Y value of the polynomial at a predetermined X value. In one example the predetermined located can be where the polynomial crosses the Y-axis. The category words are used as the function arguments. The function outputs are the corresponding Y values for the inputs; these are stored on the device, whereas the polynomial and the category mini-ICMetrics need not be stored, and are suitably discarded, which can enhance data security. The stored values on their own cannot be used to reproduce the ICMetric key as alone they cannot be used to interpolate a polynomial without a corresponding X co-ordinate. During the operation phase when the ICMetric key is required, the category mini-ICMetrics will be recreated as described above using measured features of the device, and as long as the minimum number of categories are correct (three in this example: the tolerance value), they can be combined with the stored values to create the co-ordinates that can be interpolated to reproduce the function above and thus regenerate the ICMetric key.

In this example to generate an ICMetric key, the categories are combined to produce a 256-bit key with theoretical entropy of up to $2^{135}$ unique values. The example given here gives specific examples for features that can be easily altered to create more complex categories with higher entropy. For example, Category 2 could use more characters of the Wi-Fi SSID, Category 3 could use a combination of contacts or use a variety of different filters based on other aspects of the contact details and/or Category 4 could be extended by making use of multiple images. All of these examples increase the complexity of each category respectively.

RSA Embodiment Scenario

The RSA cryptographic system is a prime example of a typical system that could be integrated with ICMetrics. In such an example, an ICMetric key may be employed as the private key, d', of the asymmetric key pair. This key is then hashed twice with SHA-256 before being used. In current systems the private key must be physically stored on the device, if it is to decrypt data that has been encrypted with its public key. This leaves these systems vulnerable to backdoor attacks, as it is theoretically possible to gain access to and steal this private key. However, if ICMetric technology is used to generate the private key, then the private key would not need to be stored, but could be regenerated when required from the feature values. When deploying the RSA algorithm in such a way, it is necessary to begin by randomly selecting two distinct and large prime numbers, which in this example can be described as p and q. These prime numbers are selected through the repeated use of the Rabin-Miller primality test for candidate values until appropriate p and q values are found. The modulus for both the private and public keys, named $n_{mod}$, is then calculated using:

$$n_{mod}=p*q$$

The number of totatives for $n_{mod}$ is then calculated and represented as $\varphi(n_{mod})$. In a typical RSA key generation process the private exponent d is then picked by selecting a totative of $\varphi(n_{mod})$, using these two rules:

Rule 1: $1<d<\varphi(n_{mod})$
Rule 2: $\gcd(d, \varphi(n_{mod}))=1$

The problem of integrating an ICMetric key into the RSA system arises at this point as the ICMetric-generated value d' we wish to use as d is not necessarily co-prime with $\varphi(n_{mod})$ and therefore rule 2 may not hold true. This problem can be solved through the use of an offset function that takes the d' along with an offset and returns the private key d, as can be displayed in this third rule:

Rule 3: $d=f(d', offset)$

The offset must be selected such that all three rules hold true. The function in this example may use addition or the XOR bitwise operation in order to return an appropriate value for d, although many options are possible here. The public key exponent e can then be derived by employing the extended Euclidian algorithm. The values n and e are retained as the public key exponent as usual. Additionally, it is necessary to retain the function f and offset locally on the device. An advantage of the system is that d can be generated on demand using rule 3 and therefore the values d', d, p, q and $\varphi(n_{mod})$ can all be discarded as soon as e has been generated. However in this system, the e value will not be conveniently small and therefore the encryption process will not be optimally fast. On the other hand, it is not possible to employ the Chinese remainder theorem for easy decryption as the values p and q are discarded. A distinct trade-off in the system's efficiency is made to greatly increase its security.

Embodiment for Elliptic Curves and Digital Signature Algorithm

Another algorithm that shows great potential for integration with ICMetric technology is Elliptic Curve cryptography (ECC). This cryptographic system is sometimes used in the Digital Signature Algorithm (DSA) to produce the necessary asymmetric keys. Therefore, if successfully integrated there is potential to distribute digital signatures that have been encrypted with an ICMetric-generated private key. The initiation of an Elliptic Curve Digital Signature Algorithm (ECDSA) is undertaken in two distinct stages: parameter generation and computation of user-specific keys. During the parameter generation stage, three specific parameters must be generated and agreed upon by the users of the system. These parameters can be said to be: (CURVE, G, $n_{EC}$). The elliptic curve equation is denoted as CURVE and is generally defined by the operator of this system. The base point on the curve is denoted as G while the multiplicative order of point G is denoted as $n_{EC}$. Once the parameters have been defined by the system operator, they can be shared between all users of the system for use during the signing and verification processes.

The user-specific key generation stage produces a private and public key pair on a system user's device. In the traditional approach to implementing ECDSA the private key $d_A$ is randomly selected with the constraint that it falls within multiplicative order of G; therefore it must be within the bounds $[1, n_{EC}-1]$. However, unlike the RSA implementation (mentioned above), $d_A$ can be produced with relative ease through the ICMetric key generation process. In this system the ICMetric key must only adhere to the single rule in that it falls within the multiplicative order of G. If this rule is met the ICMetric key can be used as $d_A$. If the ICMetric key does not adhere to this rule, the modulo-operation must be applied to $d_A$ using n as the modulus. The ICMetric-generated $d_A$ can then be applied to the following trapdoor function in order to generate its public key $Q_A$ counterpart:

$$Q_A = d_A \times G$$

where X is an elliptic curve point multiplication by a scalar.

The public key $Q_A$ can now be distributed between each other user of the system and stored alongside the other parameters. The distinct advantage of using ICMetric technology in the generation of $d_A$ is that it can now be discarded at this point in the process; there is no need to store it. At the time that a digital signature needs to be produced, $d_A$ can once again be immediately generated through the use of ICMetrics. The verification process can be undertaken as it traditionally is, as each device's $Q_A$ must still be stored in memory.

Correlated Features

Correlated features are desirable, as they provide a greater level of obfuscation than singular features. This is because they are derived from singular features. A part of the obfuscation of the ICMetric key generation process is related to hiding the list of the features that are used in the process. Singular features are features that are measured directly from the device rather than being derived. Correlating features adds an extra step when trying to recreate the values, as the correlated values have to be generated and cannot be read directly from a device. Importantly, each correlated feature can itself be used as a feature, which has the benefit of increasing the entropy of the key, generated by the ICMetric algorithm. Additionally, a correlated feature that is chosen can be the subset of features that are more stable than the singular feature, as they represent a relationship between features rather than coming from a specific range, meaning that there is less intra-sample variance, thus increasing reproducibility of the generated key. While a basic analysis can focus on correlations between two features, this can be extended to look at any number of features together.

Table 6 shows example embedded hardware features used to produce a correlation analysis, such as a correlation matrix, of all the feature pair combinations. Each point in the matrix represents the correlation between the feature relating to the row and the feature relating to the column where the identity of the feature may be read from Table 6. The colour (or shading in a greyscale representation) of the square at that point is how strongly the features are correlated on a scale from yellow (lighter) to red (darker) where yellow represents a strong positive correlation, red represents a strong negative correlation and orange (in between lighter and darker extremes) represents no correlation.

TABLE 6

Features used in Correlation Matrices

| | | | |
|---|---|---|---|
| 1. MemFree | 2. Buffers | 3. Cached | 4. Active Memory |
| 5. Inactive Memory | 6. Active_anon | 7. Inactive_anon | 8. Active_file |
| 9. Inactive_file | 10. Unevictable | 11. HighFree | 12. LowFree |
| 13. Dirty | 14. Writeback | 15. AnonPages | 16. Mapped |
| 17. Shmem | 18. Slab | 19. SReclaimable | 20. SUnreclaimable |
| 21. KernelStack | 22. PageTables | 23. Committed_AS | 24. VmallocUsed |
| 25. VmallocChunk | 26. Exec_time | 27. Avail_memory | |

The entries in Table 6 are suitably defined as below. It will be understood that these are only example definitions, and that variations to these definitions will be readily apparent. Taking the first definition, of MemFree, as an example, whilst the definition provides that it is the amount of unused RAM in kilobytes, it might instead be some other division of memory, such as megabytes.

MemFree: The amount of physical RAM, in kilobytes, left unused by the system.

Buffers: The amount of physical RAM, in kilobytes, used for file buffers (storage for raw disk blocks).

Cached: Memory in page (disk) cache, minus swap cache.

Active Memory: The total amount of buffer or page cache memory, in kilobytes, that is in active use (not reclaimed/swapped out).

Inactive Memory: The total amount of buffer or page cache memory, in kilobytes, that is free and available.

Active_anon: Anonymous memory that has been used more recently and usually not swapped out.

Inactive_anon: Anonymous memory that has not been used recently and can be swapped out.

Active_file: Pagecache memory that has been used more recently and usually not reclaimed until needed.

Inactive_file: Pagecache memory that can be reclaimed without huge performance impact.

Unevictable: Unevictable pages that cannot be swapped out. This may be for a variety of reasons.

HighFree: The total and free amount of memory, in kilobytes, that is not directly mapped into kernel space.

LowFree: The total and free amount of memory, in kilobytes, that is directly mapped into kernel space.

Dirty: Total amount of memory, in kilobytes, waiting to be written back to disk.

Writeback: Memory, in kilobytes, which is actively being written back to disk.

AnonPages: Non-file backed pages mapped into user space page tables.

Mapped: The total amount of memory, in kilobytes, which has been used to map devices, files, or libraries using the mmap command.

Shmem: Total used shared memory (shared between several processes, thus including RAM disks, SYS-V-IPC and BSD like SHMEM).

Slab: Total amount of memory used by the kernel to cache data structures for its own use.

SReclaimable: The part of the Slab that might be reclaimed (such as caches).

SUnreclaimable: The part of the Slab that cannot be reclaimed under memory pressure.

KernalStack: The memory the kernel stack uses. This is not reclaimable.

PageTables: The total amount of memory, in kilobytes, dedicated to the lowest page table level.

Committed_AS: The total amount of memory, in kilobytes, estimated to complete the workload. This value represents the worst-case scenario value, and also includes swap memory.

VmallocUsed: The total amount of memory, in kilobytes, of used virtual address space.

VmallocChunk: The largest contiguous memory block of available virtual address space.

Exec_time: System performance measured as execution time.

Avail_memory: Available memory.

The aim of these visualisation matrices is to find reliable correlations that are exhibited for all the devices. With reference to FIG. 3, it can be seen that the following pairs of features showed a strong positive correlation with a Pearson correlation coefficient over 0.8, thus indicating that they have a sufficient correlation to be considered. Active Memory (4) and Active File (8) are directly correlated with each other and have an average correlation coefficient 0.85; similarly, Inactive Memory (5) and Inactive File (9) are strongly correlated with a coefficient of 0.99. The Active Anonymous (6) and Anonymous Pages (15) also show a strong positive correlation, all of these correlations are based on the fact that the former feature encompasses the latter feature completely such that the first feature is a combination of the second feature plus one or more additional feature. Additionally, correlations such as between Slab (18), the total amount of memory used by the kernel for its cache data structures, and SReclaimable (19), which is shows definitive correlations as the SReclaimable is part of the slab memory. The features PageTables (22) and Committed_AS (23) also show a strong positive correlation without any straightforward explanation for a correlation. This makes for a highly-obfuscated feature and the correlation would not be easily determinable without knowledge of the feature making it an extremely useful feature.

Figure 4:
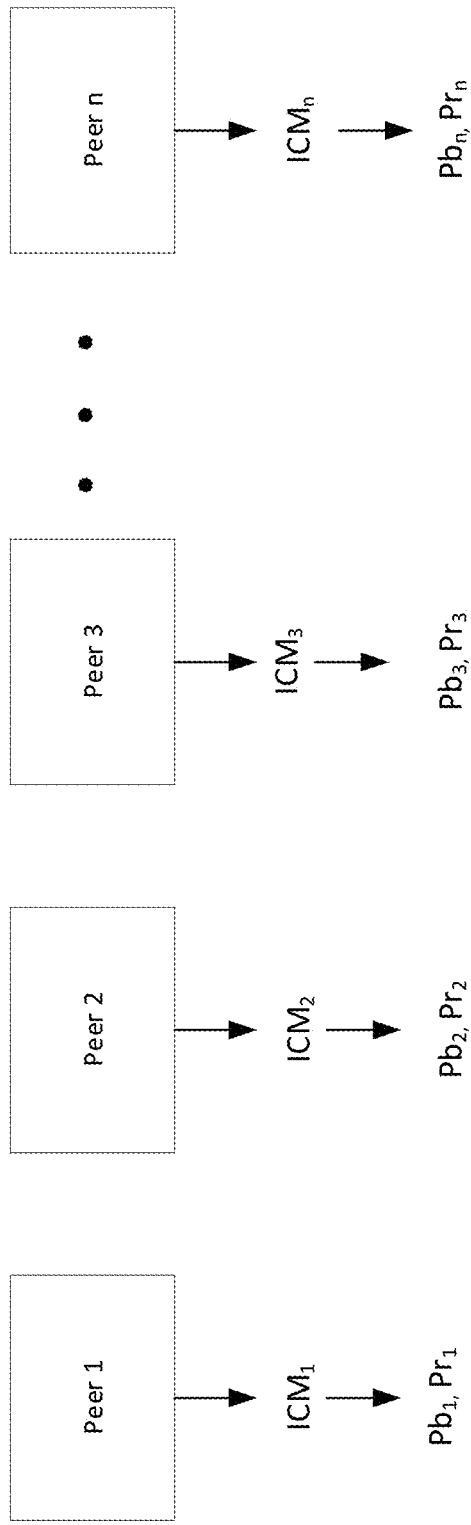
FIG. 4 illustrates an example of generating ICMetric public/private key pairs.

Reference is now made to FIG. 4. FIG. 4 shows a simplified illustration of the generation of public/private key pairs for a group of n peers. In the illustrated example, respective ICMetrics ($ICM_1$, $ICM_2$, $ICM_3$, ..., $ICM_n$) for each of the n peers are used in the generation of the public/private key pairs $Pb_1Pr_1$, $Pb_2Pr_2$, $Pb_3Pr_3$, ..., $Pb_nPr_n$, though as discussed, this need not be the case.

Trusted Ring

Once the public/private key pairs have been generated for each peer in the group, whether in dependence on ICMetric techniques or otherwise, a trusted ring can be established for these peers. The trusted ring can provide security among a group of peers, for example among a group of entities or devices in an IoT network.

A trusted ring key, for example an ICMetric trusted ring key (where, for example, at least one of the public/private key pairs for the peers in the ring is derived in dependence on ICMetric techniques), is derived for the trusted ring. The derivation of the trusted ring key can be based on a quorum established via secret sharing techniques, for example Shamir secret sharing techniques.

The quorum can be set as desired. In one example, 5 peers are present in a ring, and it is determined that at least 3 of the peers must validly contribute to a ring output for that output to be authenticated. Thus, in this example, 1 or 2 peers of the ring can be absent, compromised or dissent, and the ring output may still be validly authenticated. Referring to the terminology above, the size of the group, n, is 5 and the threshold number of peers needed for authentication, N, is 3. If more than 2 peers of the ring are absent, compromised or dissent (i.e. fewer than 3 peers validly contribute to the output), then the output of the ring is not authenticated.

Once the quorum (N) is determined, a polynomial of order (N−1) is securely randomly generated (as in the example above for the case of a quadratic polynomial). The output value of the polynomial function at a given input value is selected to be the trusted ring key. For example, the y-intercept can be selected to be the trusted ring key.

For each peer of the ring, its private key is used as an input value to determine the corresponding polynomial output value. Thus, in the example where N=3 and n=5, a quadratic polynomial is securely generated. The polynomial output values, $Y_i$, are determined that correspond to input values of the private keys of each peer, $Pr_1$, $Pr_2$, $Pr_3$, $Pr_4$, and $Pr_5$. 5 coordinate pairs, $(Pr_i, Y_i)$, are therefore obtained. The trusted ring key may be used at this stage, if desired, for example in an encryption process.

The trusted ring key and the private keys of the peers need not be stored. Suitably, to enhance system security, the trusted ring key and the private keys of the peers are discarded. All that need by stored are the set of $Y_i$ corresponding to the peer private keys, and the order of the polynomial, (N−1). Discarding the trusted ring key and the private keys of the peers means that an attacker is unable to obtain the trusted ring key even if access to a peer is obtained. The polynomial, and hence the trusted ring key, cannot be determined from just the set of $Y_i$ and the order of the polynomial.

Once the trusted ring key has been established, it can be regenerated at a later stage, when needed. The process for establishing the trusted ring key can be carried out when the trusted ring key is first needed, or it can be carried out earlier in an initialisation phase. Suitably, the trusted ring key is established in an initialisation phase, when potential corruption of peers may not have been able to take place.

According to the principles of secret sharing, the polynomial, and hence the trusted ring key, can be derived (regenerated) where 3 or more of the coordinate pairs are known. For example, where access is available to 3 or more of the 5 peers in this example group, the private keys of each peer can be regenerated. Where the private keys are obtained in dependence on ICMetric techniques, a compromised peer is likely to have changed such that the resulting ICMetric will be different compared to the original, uncompromised, peer. Thus, the private keys of such compromised peers will differ from the private key used to obtain the respective $Y_i$ coordinate. This peer will therefore not be able to contribute to correctly identifying the polynomial, and so cannot contribute to identifying the trusted ring key. Peers that are unable to generate the correct ICMetric because of being compromised can be automatically excluded from the trusted ring.

Figure 5:
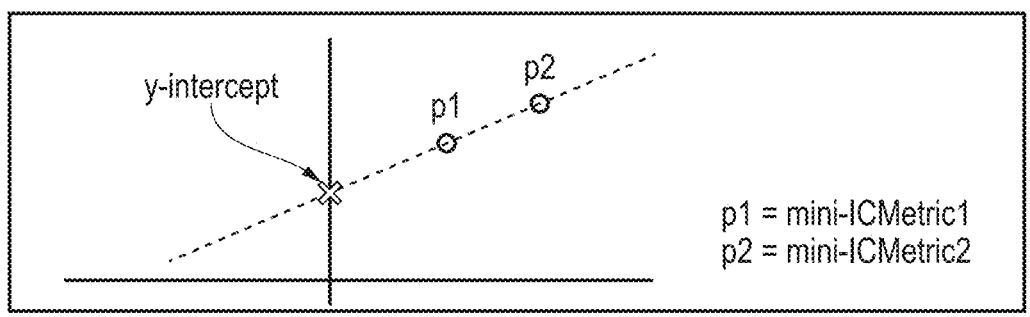
FIG. 5 illustrates an example polynomial showing the y-intercept.
Figure 6:
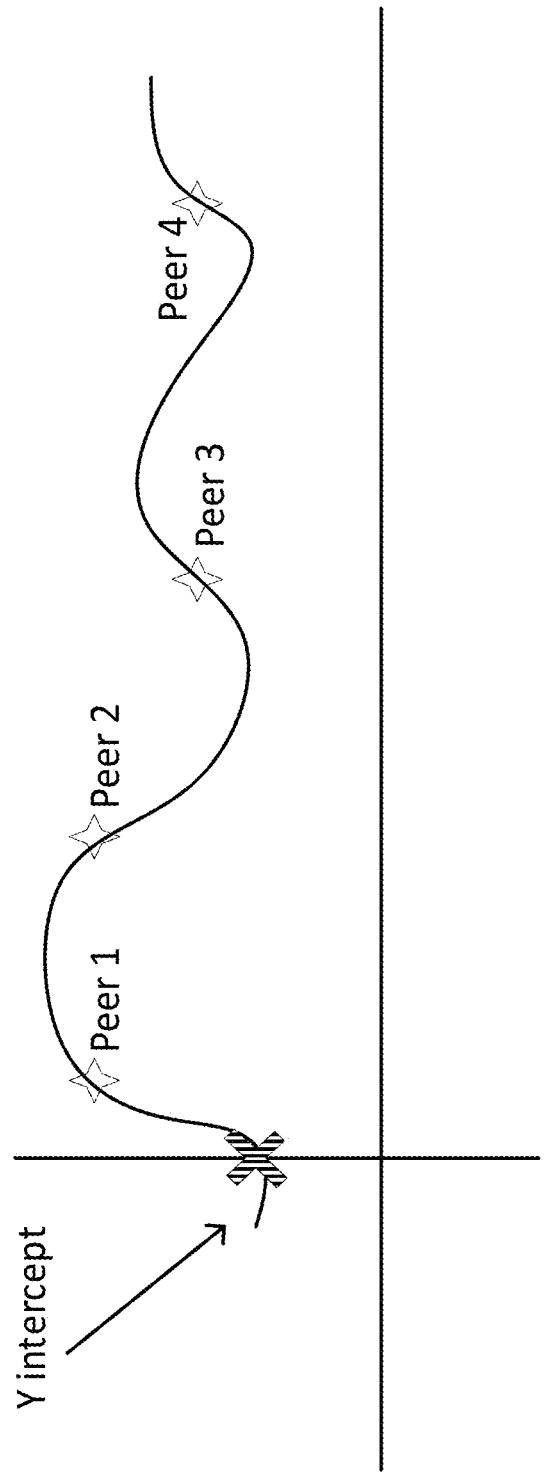
FIG. 6 illustrates another example polynomial showing the y-intercept.

For each set of 3 peers within the group of 5 peers, the regenerated private keys are used as x-coordinates corresponding to the respective one of the set of y-coordinates, $Y_i$. Each set of 3 peers will therefore lead to the generation of a respective candidate trusted ring key. An example of how a candidate trusted ring key (the y-intercept of the polynomial in this example) may be generated for polynomials of order 1 is illustrated in FIG. 5. An example of how a candidate trusted ring key (the y-intercept of the polynomial in this example) may be generated for a higher-order polynomial is schematically illustrated in FIG. 6.

Each candidate trusted ring key can be verified, for example by attempting to decrypt a message previously encrypted with the actual trusted ring key. The candidate trusted ring key that successfully decrypts the message can be determined to be the trusted ring key.

Trusted Ring Signature

Figure 7:
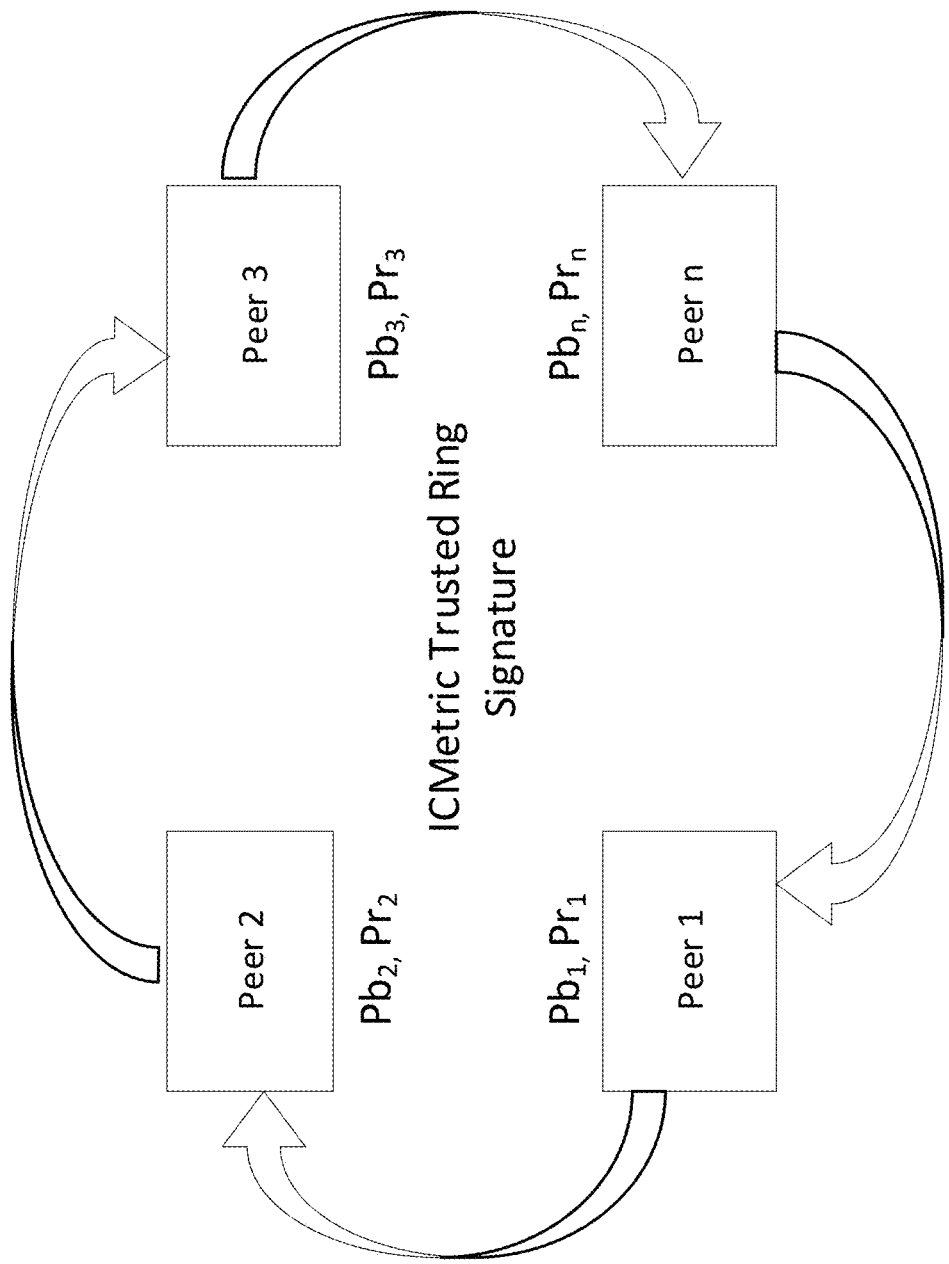
FIG. 7 illustrates an example of a trusted ring.

Reference is now made to FIG. 7, illustrating an example of generating a trusted ring signature. The trusted ring signature can be generated in dependence on the peers that are to form part of the trusted ring (note that this need not be the same number of peers as the peers that contributed to the generation of the trusted ring key—in some examples there are fewer peers contributing to the trusted ring signature).

A trusted ring signature is constructed in such a way that the ring can only be completed and therefore verified correctly if the signer has knowledge of the private key corresponding to one of the public keys in the ring. Thus, the signer needs access to a private key corresponding to a public key of a peer that forms part of the trusted ring. The signer may be a peer forming part of the trusted ring. The signer will have access to its own private key.

Once a ring signature has been generated, the ring signature can undergo a further operation to generate a verifier. The verifier is for use in verifying the ring signature. In some examples, the ring signature can be combined with the ring key to generate the verifier. In some examples the ring signature is XORed with the ring key to generate the verifier.

An example of generating a verifier in dependence on the ring signature is as follows.

The ring signature can be generated in dependence on (i) a message, (ii) the private key of the signer ($Pr_s$), (iii) the public keys of peers in the trusted ring other than the signer ($Pb_i$, i≠s) and (iv) the ring key.

A symmetric key K can be chosen in dependence on the public keys of peers other than the signing peer, s, as $$K = H(\text{Msg}, \{Pb_i, \ldots, Pb_n : i \neq s\})$$

where H is a hash function and Msg is the message.

A one-way function (also known as a trapdoor function or glue function) is determined. The one-way function can be selected to be a random one-way function. The one-way function, which can be used here as a verifier (the one-way function may be termed a verification function), can be selected as $v\{0,1\}^b$, where b is the key length. The signing peer can select the one-way function.

The one-way function, v, can be selected in the following manner.

A set of tags $x_i = \{0,1\}^b$ can be selected for all ring members other than the signer (i.e. where i≠s). Each tag of the set of tags can be random. The signer can select one or more of the tags. The tag for the signer can be selected as the signer's private key, i.e. $x_s = Pr_s$. The tags selected can be the same for each transaction. The tags can be different for different transactions. The tags selected for a given transaction are suitably stored. The stored tags are suitably available to a verifier for use during a verification process.

The signer computes $$y_i = g_i(x_i)$$

where $$g_i(x_i) = \begin{cases} q_i n_i + f_i(r_i) & \text{if } (q_i+1)n_i \leq 2^b \\ m & \text{else} \end{cases}$$

where $q_i$ and $r_i$ are non-negative integers such that $m = q_i n_i + r_i$, and where $f_i(x) = x^{Pb_i} \pmod{n_i}$.

$q_i$ and $r_i$ can be chosen at random. $n_i$ is the modulus size, for example corresponding to an RSA-decode modulus size. $n_i$ suitably has the same conditions as RSA. This computation ensures that the correct number of bits are present, to meet the conditions of the required size of the key.

The signer then solves the following equation $$C_{k,v}(y_1, y_2, \ldots y_n) = v_0$$

The function C can be any desired function, for example XOR, an addition and so on. The $y_i$ are of the same size. In at least some examples the size of $y_i$ is also b (the key length). The $y_i$ are suitably one-way functions. The function C need not be the same for each transaction. C is suitably dependent on K (i.e. related to the hashed message). As well as taking the $y_i$ as arguments, the arguments of function C can, in some examples, comprise the ring key. This can advantageously enhance the security of the ring signature.

A verification function, v, is then determined as $$v = v_0 \text{XOR(Ring Key)}$$

This verification function, v, can be used during a later verification procedure to verify that a ring signature is authentic.

In some examples an existing verification function may be used. The existing verification function can be combined with the ring key, for example by XORing the existing verification function with the ring key. This can lead to enhanced security compared to using the existing verification function on its own.

Verifying A Ring Signature

A previously generated ring signature can be verified to ensure that the output from the ring is authentic. This can be done, for example, by regenerating the verification function and checking whether it is a match for the verification function appended to (or forming at least part of) the ring signature. Where the ring signature is verified, it can be determined that the output of the ring was validly generated. Thus, verification of the ring signature can be used to enhance the security of an operation output from the ring, e.g. where the ring instructs a particular operation to be carried out, or it can be used as an additional security measure to authenticate a ring output.

The ring signature can be verified by a peer forming part of the trusted ring. The ring signature can be verified by an entity separate from the members of the trusted ring, as long as the verifier has access to certain stored values, as will be explained below.

The ring transaction, such as the output from the ring, can be verified by checking whether the ring signature is valid, e.g. whether the ring signature validly corresponds to the trusted ring key, for example the ICMetric trusted ring key, and to the respective private key of the signing peer, for example the ICMetric-based private key of that peer. If the ring key and the signature are determined to be valid, the transaction may be permitted to proceed. If one or both of the ring key and the signature are determined to be not valid, the transaction may be restricted from proceeding. In some examples, the transaction may be stopped. Where a determination is made that the ring signature is not valid, the signing peer can be excluded from taking part in the trusted ring.

Thus the verification process may comprise two stages. A first stage can comprise verifying the ring key. A second stage can comprise verifying the ring signature (which is generated in dependence on the ring key). If the ring key is not verified, then it may be determined that the ring signature is not verified without performing computations in respect of the ring signature. Thus, a determination of the authenticity of the ring signature can be made in dependence on the authenticity of the ring key.

In the first stage, of verifying the ring key, the ring key (which will suitably have been discarded earlier in the process, after having been used) is regenerated. The regenerated ring key can then be checked to verify if it is correct. This check may be performed in any convenient manner. For example, the regenerated ring key can be used to decrypt a message previously encrypted with the ring key. A determination that the regenerated ring key is correct can be made in dependence on a successful decryption of the message.

On initially determining the ring key for a number of peers, it can be determined how many peers are required to successfully regenerate the ring key. This number of peers can be termed a tolerance value. A polynomial is then generated, for example randomly generated, with an order that is one less than the tolerance value. For example, where 4 peers are to be required to successfully regenerate the ring key (i.e. the tolerance value is 4), a polynomial of order 3 can be generated. The ring key can be determined to be the function of the polynomial at a given value. for example, the ring key can be determined to be the y-intercept of the polynomial.

A value is determined for each peer. This value may be termed a security credential. The security credential may be obtained in accordance with an ICMetric technique. For example, the security credential for a given peer can comprise an ICMetric-based value. In some examples, another value, such as a conventional key, can be combined with an ICMetric-based value to derive the security credential. For example, a conventional key can be combined with an ICMetric-based value in an XOR combination operation.

The determined security credentials can be used as respective first parameters of the polynomial to generate a set of corresponding second parameter values. The security credentials can be used as x coordinates and the polynomial function used to determine the respective corresponding y coordinates. The set of second parameter values can be stored, together with the order of the polynomial. The security credentials and the polynomial may be discarded. The ring key may be discarded. Suitably the security credentials, the polynomial and/or the ring key are discarded in dependence on the storing of the set of second parameter values and the order of the polynomial. It is not possible to regenerate the polynomial based on the stored set of second parameter values and the order of the polynomial. Hence it is not possible to regenerate the ring key without additional information.

In verifying the ring key, it is necessary to obtain security credentials for at least a number of peers corresponding to the tolerance value. Suitably, security credentials can be obtained for all of the peers. A security credential can be obtained for a given peer by regenerating the ICMetric value for that peer. The ICMetric value will be the same as the earlier-generated ICMetric value only where the peer has not been compromised in the meantime. Thus the ring key can only be regenerated where a number of peers corresponding to the tolerance value have not been compromised.

Regenerating the ring key comprises determining a plurality of security credentials in dependence on one or more feature of respective peer devices of the ring. The stored set of second parameter values and the stored value indicating the order of the polynomial are read. Coordinates can then be determined from respective ones of the security credentials and respective ones of the second parameter values. Using at least a subset of the determined coordinates, coefficients of a polynomial with an order indicated by the stored value can be determined. A predetermined function of the resulting polynomial can be determined, and stored as a possible ring key. For example, the y-intercept of the resulting polynomial can be stored as the possible ring key. The steps of determining the coefficients and determining the predetermined function of the polynomial can be repeated so as to determine a set of possible ring keys. It is then verified whether the set of possible ring keys comprises the ring key. This verification step can be performed in any convenient manner, for example by attempting to decrypt a message previously encrypted with the correct ring key. On verification of the ring key, the verification process can move to the second stage. In some examples, the verification process may proceed to the second stage irrespective of the verification of the ring key.

In the second stage, a verifier entity, for example a verification device, can check whether a signature is valid by checking the augmentation of the ring key, such as the ICMetric ring key, with the verification function. The example below shows a ring signature scheme for verifying a trusted ring verifier, for example an ICMetric trusted ring verifier.

A ring verifier can be computed in dependence on (i) a message, (ii) the set of tags, $x_i$, generated as part of the ring signature process, (iii) the public keys of peers in the trusted ring, $Pb_i$, and (iv) the ring key.

The set of tags generated as part of the ring signature process, together with the public keys of peers of the ring, can be cached in the system. For example, the set of tags and/or the public keys can be stored at a memory location accessible to the verifier. The set of tags and/or the public keys can be sent to the verifier before or as part of the verification process. Similarly, the message can be accessible to the verifier and/or can be sent to the verifier before or as part of the verification process.

The verification function, v, used in or as part of the ring signature, and an identification of the peer that computed the verification function, e.g. the signing peer, are also passed to, or are accessible to, the verifier. The identification of the signing peer permits the verifier to know which private key is to be used in the signature verification process.

A symmetric key K is chosen, for example by the verifier, as $$K=H(Msg,Pb_1,Pb_2,\ldots,Pb_n)$$

where H is a hash function and Msg is the message.

The verifier computes one-way function permutations $$y_i=g_i(x_i)$$

where $$g_i(x_i) = \begin{cases} q_i n_i + f_i(r_i) & \text{if } (q_i+1)n_i \leq 2^b \\ m & \text{else} \end{cases}$$

where $q_i$ and $r_i$ are non-negative integers such that $m=q_i n_i + r_i$, and where $f_i(x)=x^{Pb_i}(\mod n_i)$.

The set of $q_i$ and $r_i$ are suitably cached in the system as part of the ring signature generation process. The memory location at which the set of $q_i$ and $r_i$ are stored is suitably accessible to the verifier. In some examples, the set of $q_i$ and $r_i$ can be sent to the verifier before or as part of the verification process.

The set of tags, $x_i$ ($i \neq s$), are also suitably cached in the system as part of the ring signature generation process. The memory location at which the set of tags is stored is suitably accessible to the verifier. In some examples, the set of tags can be sent to the verifier before or as part of the verification process. The tag $x_s$, i.e. the private key of the signer, is not cached. The private key of the signer may be retained at the signer entity, or it may have been discarded after use as explained above. Where the private key of the signer is discarded, it can be regenerated, for example using ICMetric techniques, when needed.

Thus, the verifier is able to obtain re-computed one-way function permutations to obtain the set of $y_i$ as obtained previously by the signer during the ring signature generation process and check that they all satisfy the fundamental equation below.

The verifier solves the following equation, $$C_{k,v}(y_1,y_2,\ldots,y_n)=v_0$$

where the function C is the same function as used in the ring signature generation process.

The verification function, v, is then determined as $$v=v_0\text{XOR}(\text{Ring Key})$$

The private key of the signer is used to regenerate the ring key, as described herein. This step may be carried out by the signer itself, or by the verifier where it has access to the signer's private key. Suitably, the private key of the signer is not sent outside the signer entity. In this case, the signer may operate under the direction of the verifier to determine the verification function. In some examples the signer may act as the verifier.

This newly generated verification function can be checked against the verification function appended to, or forming at least part of, the ring signature. Where there is a match, it can be determined that the ring signature has been verified. Where there is not a match, it can be determined that the ring signature has not been verified.

Since the private key of the signer is used as part of the verification process, if the signer is unavailable or compromised in between the generation of the ring signature and the verification process, the verification will fail. If the signer is unavailable, then the signer's private key (which is not stored outside of the signer) will not be available, and so the verification process will be unable to complete.

If the signer is available, but has been compromised, or otherwise modified, then by virtue of the ICMetric generation process described herein, the private key of the signer which is determined in dependence on such an ICMetric (or combination of ICMetrics) will be different compared to the private key of the original, unmodified, signer. In this case, the verification process will result in a verification function that is different to the originally-determined verification function. Hence the verification will fail.

In some examples, it is possible to ensure that verification of the ring signature, and hence the authentication of the ring output, need not fail where a peer has been compromised or is absent. In these examples, a ring output can be signed by more than one peer. Each peer can sign the ring output in a separate process. Each of the signatures can be appended to one another, or otherwise joined or linked together and/or to the ring output.

Where a verifier determines that authentication of one of the signatures fails, the verifier (or another verifier) can attempt the verification process in respect of another of the signatures. This verification process will proceed in a similar manner.

In an illustrative example, a ring output is signed by Peer 1, which generates Signature1 in dependence on $Pr_1$ (i.e. the private key of Peer 1). The ring output is also signed by Peer 2, which generates Signature2 in dependence on $Pr_2$ (i.e. the private key of Peer 2). An attack is made on Peer 1, which alters the operating characteristics of that peer, for instance malware running at Peer 1 will alter the device's characteristics. Peer 2 remains secure.

During a later verification process, a verifier attempts to verify Signature1. Peer 1 regenerates its private key, which will now be different from its original private key since this peer has been compromised. This means that the verification of Signature1 will fail. The verifier can then attempt to verify the ring output by verifying Signature2. Peer 2 regenerates its private key, which will be the same as its original private key since this peer remains secure. This means that the verification of Signature2 will succeed. The ring output can thus be authenticated by the verifier, despite Peer 1 having been compromised in the meantime.

The verifier, or a controlling entity which is arranged to control one or more verifier, can comprise logic to perform verification of the signatures in turn. The logic can be arranged to process only those ring outputs or transactions that correctly authenticate.

Blockchain Application of Trusted Ring Techniques

Blockchains are a distributed ledger technology that can be used to track the data within the IoT ecosystem. Blockchains provide clear ownership of networked records and maintain a record of access to data. The records in the blockchain are guaranteed to be cryptographically secure, while assuming no possibility of adding false blockchain data. Permissionless blockchain networks are public and anyone can participate in them without having a specific identity. Permissioned blockchain technology on the other hand is based on a set of identifiable participants (corresponding to peers in the discussion herein) that are required to be explicitly admitted to the blockchain network to perform a specific task. However, the possibility of malicious peers in blockchain networks cannot be ignored and is a major threat to the integrity of services over permissioned blockchains.

The techniques described herein can be applied to permissioned blockchains. Each node of the blockchain, or indeed any other suitable group of nodes, can comprise one or more peer. A node can be termed a 'peer container'. A node, or peer container, might comprise a plurality of peers. In this case, the node output will depend on the plurality of peers of that node. For example, each node may comprise a ring of peers, where the node output corresponds to the ring output in the above discussion.

In some examples the ring can comprise one or more nested rings. A node of a nested ring can comprise a 'sub-ring' of peers. The sub-ring may itself comprise one or more nested rings. In this way, a hierarchy can be established which can be used to tailor authentication processes to the numbers of peers, and groups of different peers, that are required before authentication can proceed.

In the context of a blockchain, a transaction to be added to the blockchain can be signed by a node forming part of a trusted ring of nodes. A member peer wishing to add a transaction to the permissioned blockchain generates a trusted ring signature, for example based on ICMetric-based public keys of the members of the trusted ring, its own ICMetric-based private key and the ICMetric-based trusted ring key. The transaction is verified by checking whether the ring signature is valid with respect to the corresponding private key (such as an ICMetric-based private key) and the trusted ring key (such as an ICMetric-based trusted ring key). If the signer's ICMetric-based private key corresponds to one of the public keys in the trusted ring and the generated trusted ring key also corresponds to the correct ICMetric-based keys of the peer node containers, the transaction can be determined to be valid. The valid transaction can be committed as an entry on the permissioned blockchain. If the ring key and signature are not valid, the transaction is not committed onto the permissioned blockchain; the rogue node (i.e. that node leading to the failure of the verification, such as by signing with an unauthenticated private key) can be excluded from taking part in the trusted ring.

These techniques also allow the possibility of adding new entities to the trusted ring. Where a request to add a new entity to the trusted ring is validly signed by a member of the trusted ring (or a threshold number of members of the trusted ring, which may be more than one), that request can be authorised to proceed. Where the request is not validly signed, the request can be discarded or otherwise prevented from proceeding. Thus, a malicious peer is unable to add a further peer to the trusted ring in an attempt to bypass the security of the ring, since the malicious peer will be unable to validly sign the request.

In some examples, new peers are added such that a different level of security is provided in respect of the new peers. For example, an original peer might be able to authenticate where N of the n peers are present, whereas the new peer might only be able to authenticate where $N_{new}$ of the n peers are present (where $N<N_{new}\leq n$). This can be achieved, for example, by adding the new peer to an appropriate level in a nested hierarchy of rings. This approach can be used where original peers are to have greater authority than new peers, for example because they are more highly trusted, or to restrict certain authorities to a limited subset of the peers in the overall network.

The trusted ring signature, for example the ICMetric-based trusted ring signature, for IoT networks and/or permissioned blockchains, is a novel concept of regulating access to services and can produce assurance-providing protection at the especially vulnerable points. Evaluation and resilience in the presence of malware on a blockchain node is a novel concept, and ICMetric techniques have been proposed as a process for managing these adverse consequences effectively. The present techniques enable the practical use of permissioned blockchains for networked transactions by employing ICMetric techniques as a mechanism for enabling authentication and authorisation. Tampering with the constitution of the blockchain peer will cause its behaviour to change, potentially causing the features underlying the ICMetric to change. Consequently, a maliciously tampered blockchain peer will be prevented from being part of the ICMetric trusted ring, as the regenerated keys will differ from those created before its integrity was compromised.

In an example use case, the trusted ring can be provided so that a number $N_1$ of a first type of peer is required to authenticate a ring output such as a request; a number $N_2$ of a second type of peer is required to authenticate the ring output. $N_1$ may be different to $N_2$. For example, in a hospital setting, a patient's record can be requested. The request can be processed where one doctor makes the request. The request can be processed where two nurses make the request. This can reflect the greater authority that a doctor has to access patient records. In this example, peers representing doctors are of a first type of peer, and N=1; peers representing nurses are of a second type of peer, and $N_2$=2. This authorisation structure can be obtained by, for example, a trusted ring comprising a doctor node and a nurse node, where the doctor node comprises a trusted ring of doctor peers, any one of which can authenticate a doctor ring output, and the nurse node can comprise a trusted ring of nurse peers, any two of which can authenticate a nurse ring output.

Different levels of security can be provided within existing trusted rings or nested trusted ring networks. For example, one type of record may be accessible to a single doctor peer, whereas another type of record may require another peer (whether another doctor peer and/or a nurse peer) to also sign the request before that request is authenticated.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A computer-implemented method, executed using a hardware processor, for generating an authentication key for providing a digital signature at a device for authenticating an output from a ring comprising a plurality of peers, the method comprising:
generating, using the hardware processor, respective security credentials for each peer of the plurality of peers constituting a ring of peers, wherein at least one security credential is generated in dependence on one or more features of a respective peer of the plurality of peers;
generating, using the hardware processor, a ring key in respect of the ring in dependence on the respective security credential of each peer constituting the ring; and
generating, using the hardware processor, the authentication key in dependence on the ring key, a security credential of a first peer and the respective security credentials of at least one of the other peers;

in which generating, using the hardware processor, the authentication key comprises:
determining a set of one-way functions in dependence on the security credential of the first peer, wherein the set of one-way functions is determined in dependence on one or more of: a set of tags, and at least one integer value;
generating a verification function in dependence on the set of one-way functions;
combining the verification function with the ring key using a combination function to generate the authentication key, and
after generating the authentication key, discarding the ring key and/or the security credential of the first peer.

2. The computer-implemented method according to claim 1, in which the respective security credential for each peer of the plurality of peers comprises at least a portion of a public/private key pair, and the authentication key is generated in dependence on a private key of the first peer and respective public keys of at least one of the other peers.

3. The computer-implemented method according to claim 1, in which
the set of tags comprises a tag for each peer other than the first peer, the method comprising storing the set of tags; and/or
the method comprises storing the at least one integer value.

4. The computer-implemented method according to claim 1, in which generating the at least one security credential comprises:
measuring a value of the one or more feature of the respective peer of the plurality of peers to generate a respective one or more feature value,
normalising the one or more feature value using a respective normalisation map for each feature to generate one or more normalised value, and
generating the security credential in dependence on the one or more normalised value.

5. The computer-implemented method according to claim 4, in which generating the at least one security credential comprises one or more of:
using a key generation algorithm which operates on the one or more normalised value; and
using a key generation algorithm which combines a plurality of normalised values.

6. The computer-implemented method according to claim 3, comprising one or more of:
where the respective security credentials for each peer of the plurality of peers comprise public keys, storing the public keys of the peers,
storing the set of tags, and
storing the at least one integer value.

7. The computer-implemented method according to claim 1, in which
generating the ring key comprises:
determining a tolerance value indicating the number of peers required to process the ring key,
determining coefficients of a polynomial of an order that is one less than the tolerance value, the ring key being a function of the polynomial,
generating the respective security credentials comprises, for a number of security credentials equal to or greater than the tolerance value, determining each of those security credentials in dependence on the one or more feature of the respective peer of the plurality of peers, and generating the ring key further comprises:
- using each security credential as a first parameter of the polynomial to generate a set of corresponding second parameter values, and
- storing the set of second parameter values and a value indicating the order of the polynomial.

8. The computer-implemented method according to claim 7, in which one or more of:
- the tolerance value is less than the number of peers in the plurality of peers constituting the ring of peers;
- each of the number of security credentials is used as an x-value of the polynomial and the second parameter values comprise y-values; and
- the number of security credentials and the polynomial are discarded in dependence on storing the set of second parameter values and the value indicating the order of the polynomial.

9. The computer-implemented method according to claim 1, further comprising: processing method of the generated authentication key, at a device, the processing method comprising:
- receiving the generated authentication key;
- accessing a stored set of public keys for the plurality of peers in the ring of peers and an identification of the first peer;
- regenerating the security credential of the first peer in dependence on one or more feature of the first peer;
- generating, using the hardware processor, a further authentication key in dependence on the regenerated security credential of the first peer and the set of public keys; and
- verifying the received generated authentication key against the generated further authentication key.

10. The computer-implemented method according to claim 9, in which the respective security credentials for each peer of the plurality of peers comprise respective public keys which are stored as the set of public keys.

11. The computer-implemented method according to claim 9, in which the security credential of the first peer comprises a private key and the received generated authentication key is generated in dependence on that private key.

12. The computer-implemented method according to claim 11, in which regenerating the security credential of the first peer comprises regenerating the private key of the first peer and the generated further authentication key is generated in dependence on the regenerated private key.

13. The computer-implemented method according to claim 9, in which the received generated authentication key is associated with a message, and the processing method comprises authenticating the message in dependence on verifying that the received generated authentication key verifies against the generated further authentication key.

14. The computer-implemented method according to claim 13, comprising determining that the received generated authentication key verifies against the generated further authentication key where the received generated authentication key matches the generated further authentication key.

15. The computer-implemented method according to claim 9, comprising generating the ring key in respect of the ring and generating the generated further authentication key in dependence on the ring key.

16. The computer-implemented method according to claim 15, in which generating the ring key comprises:
- (a) determining a plurality of security credentials in dependence on one or more feature of respective peers of the plurality of peers of the ring,
- (b) reading a stored set of parameter values and a stored value indicating an order of a polynomial,
- (c) determining coordinates from respective ones of the security credentials and respective ones of the parameter values,
- (d) using at least a subset of the determined coordinates to determine coefficients of a polynomial with an order indicated by the stored value,
- (e) determining a predetermined function of the polynomial,
- (f) storing the predetermined function as a possible ring key,
- (g) repeating steps (d) to (f) for all the subsets of coordinates to determine a set of possible ring keys,
- (h) verifying whether the set of possible ring keys comprises the ring key.

17. The computer-implemented method according to claim 9, comprising generating the generated further authentication key in dependence on a stored set of tags and/or at least one stored integer value.

18. A system for generating an authentication key at a device for authenticating an output from a ring comprising a plurality of peers, the system comprising a computer processor configured to:
- generate respective security credentials for each peer of the plurality of peers constituting a ring of peers, wherein at least one security credential is generated in dependence on one or more features of a respective peer of the plurality of peers;
- generate a ring key in respect of the ring; and
- generate the authentication key in dependence on the ring key, a security credential of a first peer and the respective security credentials of at least one of the other peers;
- wherein, in order to generate the authentication key, the computer processor is further configured to:
- determine a set of one-way functions in dependence on the security credential of the first peer, in which the set of one-way functions is determined in dependence on one or more of: a set of tags, and at least one integer value;
- generate a verification function in dependence on the set of one-way functions;
- combine the verification function with the ring key using a combination function to generate the authentication key; and
- after the authentication key is generated, discard the ring key and/or the security credential of the first peer.

* * * * *